R. BETTERMANN.
TAPPING APPARATUS.
APPLICATION FILED MAR. 25, 1915.
1,154,603. Patented Sept. 28, 1915.
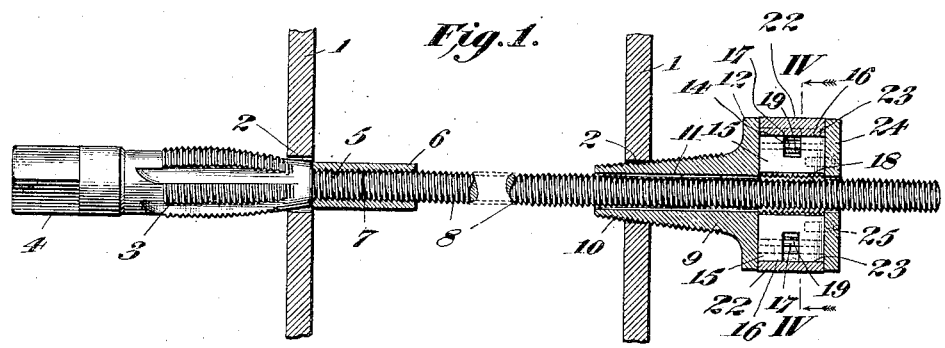
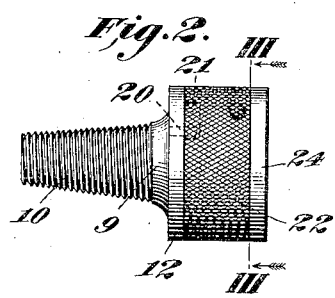 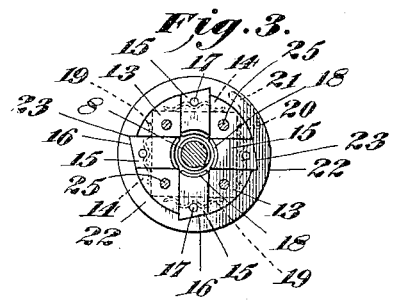
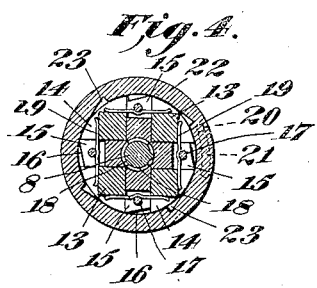 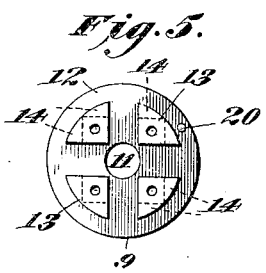
WITNESSES:
Elmer Leavey
F. A. Stahl.
INVENTOR
Reinhold Bettermann.
BY Geo. E. Thackray
his ATTORNEY

UNITED STATES PATENT OFFICE.

REINHOLD BETTERMANN, OF JOHNSTOWN, PENNSYLVANIA.

TAPPING APPARATUS.

1,154,603.  Specification of Letters Patent.  Patented Sept. 28, 1915.

Application filed March 25, 1915. Serial No. 16,854.

*To all whom it may concern:*

Be it known that I, REINHOLD BETTERMANN, a citizen of the United States, residing in the city of Johnstown, in the county of Cambria and State of Pennsylvania, have invented certain new and useful Improvements in Tapping Apparatus; and I do hereby declare the following to be a full, clear, and exact description of the invention, such as will enable others skilled in the art to which it appertains to make and use the same.

My invention relates to improvements in tapping apparatus, with particular reference to producing screw threaded holes in separated plates or sheets in such a way as to form a continuous thread in both the plates or sheets and without the necessity of using an extra long or expensive tap for this purpose.

My invention is particularly adapted for use in providing screw-threaded holes in the mud legs of boilers of the locomotive type or in the crown sheets of the same which are supported by radial staybolts; in the cone top portion of submerged vertical tubular boilers, the cone top of which is ordinarily supported from the upper part of the shell by screw threaded staybolts; and is also adapted for use in the construction of water tube boilers the headers of which are formed of water legs secured together by screw-threaded staybolts. My apparatus is also useful in connection with the construction of tanks, stills, and in fact any apparatus which requires a continuous thread in two separated portions.

The staybolt taps now in general use are made about three times as long as the distance between the plates or sheets to be stayed, and only about one-third of the length of this tap, at its middle portion, is threaded, the forward end being smooth and tapered to enable the tap to enter the farther hole, while the rear end is also smooth or unthreaded in order to guide it and to facilitate its leaving the first hole. If the distance between plates to be threaded with an old style tap is such as ordinarily exists in a locomotive mud leg, namely, four or five inches in the clear between plates, an old style staybolt tap as above described would be about eighteen inches long and in a cramped location it would be very difficult to enter it and to withdraw it, and in many cases it would be impossible. If the distance between the plates or sheets should be, as it sometimes is, as much as two feet, the length of an old style tap would have to be about six feet, which is very impracticable.

When the distance between two plates to be tapped exceeds the length of the threaded portion of the old style tap the latter leaves the outer sheet before the thread is started in the inner sheet, the result being that the threads of the two sheets are not continuous, as they should be. This difference in the threads produced by the old style tap may be slight or it may equal almost a whole thread and when a staybolt having a continuous thread is screwed through the threaded hole in the first sheet and reaches the opposite sheet the threads do not engage it as they should and the staybolt therefore has to force the sheets apart until the threads register and the staybolt enters. When this occurs stresses are set up in the threads of the bolt and of the sheets and the sheets themselves are stressed and bent. Staybolts are of necessity placed close together and in this way the sheets and the various staybolts themselves are stressed differently, due to the inaccuracies mentioned, with the result of bad workmanship leading to danger and speedy deterioration. This is particularly true of radial sheets and cone top sheets above referred to, as on account of their shape such sheets are comparatively stiff of themselves and the incorrect or unregistered threading sets up very powerful and destructive stresses in the plates, the sheets and staybolts.

My invention is designed to obviate the defects and difficulties hereinbefore mentioned and will cut with a short and easily handled tap a continuous thread in two plates, regardless of the relative conformation of the plates or distances between them.

Having thus given a general description of my invention I will now, in order to make the same more clear, refer to the annexed sheet of drawings forming a part of this specification and in which like characters of reference refer to like parts:

Figure 1 is a longitudinal sectional elevation of my tapping device showing enough of the boiler plates to illustrate the manner of cutting a continuous thread in the staybolt holes previously formed therein, by drilling or otherwise; Fig. 2 is a side elevation of my lead spindle nut; Fig. 3 is a transverse sectional elevation taken on the line III—III of Fig. 2; Fig. 4 is a vertical transverse sectional elevation taken on the line IV—IV of Fig. 1; and Fig. 5 is an end elevation of a part of the lead spindle nut.

Referring now to the characters of reference on the drawings:—1—1 indicate the spaced boiler plates or sheets and 2—2 the holes therein which are to be threaded by the short tap 3 to receive the staybolt. This tap 3 has the usual squared or polygonal shaped end 4 to receive a wrench or other tool for operating the same when cutting the threads in the holes 2. The forward end of the tap is formed with a screw-threaded stud or projection 5 which is screwed into a coupling 6, where its end 7 abuts against the end of the lead spindle 8 which is screw-threaded throughout its length and has mounted thereon a clamping nut 9 having a tapered externally threaded surface 10 adapted to engage one of the staybolt holes 2 in one of the plates while the tap is cutting the thread in the hole of the opposite plate. By having the portion 10 tapered this prevents it from turning by means of its wedging action particularly when forcibly screwed into one of the staybolt holes, and it also fits it centrally in different sized holes, such as ¾ inch to ¼ inch diameter or larger.

11 indicates a central longitudinal opening in the nut through which the lead spindle passes and 12 is an annular flange extending around the intermediate portion of the nut. Four clamping jaw supports 13 are provided in the lead spindle nut having kerfs 14 formed therein to receive the ends of leaf springs 19, these jaw supports 13 are spaced apart to form ways in which the clamping jaws 15 may move inwardly or outwardly. These clamping jaws 15 have beveled outer edges 16 forming cam surfaces and are provided with inner screw threaded edges 18 adapted to engage the thread of the lead spindle; the central portion of each jaw having a kerf to register with those in the jaw supports so as to receive the leaf springs 19 which are provided with pins 17 to hold them in position. The springs 19 normally tend to hold the jaws 15 out of engagement with the lead spindle 8. A pin 20 projects from the side of the annular flange 12 on which the jaw supports are located and extends into a socket 21 in the cam ring 22, which has internal cam notches 23 adapted to operate the clamping jaws 15. A retaining disk 24 holds this cam ring in position by means of screws 25.

It should be noted that the lead spindle 8 is provided with a screw thread, having so many threads per lineal inch which is exactly the same number of threads per lineal inch as those of the tap 3, and this is equally true of the internal and external threads of the lead spindle nut 9; in other words all the threads of the apparatus are of the same pitch.

The operation of my device is as follows: The tap 3 with the lead spindle coupled thereto is inserted in one of the holes 2 to be tapped, with the lead spindle projecting through the other hole as illustrated in Fig. 1. The nut 9 with the clamping jaws 15 open, is passed over the end of the lead spindle until the externally threaded tapered portion 10 of the nut 9 enters the hole in the opposite sheet as far as its tapered form will permit; the clamping jaws 15 of the nut 9 are then closed upon the lead spindle by means of a slight turn of the cam ring 22, which is limited in its movement by means of the stop pin 20 in the socket 21, so that the internal threads of the jaws 15 have a running fit on the threads of the lead spindle 8. The tap 3 is then turned and advances, cutting a thread in the sheet of the same pitch as that of the tap and the lead spindle. The nut 9 is then taken off the end of the lead spindle 8 by turning the cam ring in the reverse direction which unlocks the clamping jaws 15 and the nut is easily withdrawn. The tap is then unscrewed and taken out of the tapped hole and the tap and its spindle are entered into the opposite side of the other sheet and the threaded hole is now used to receive the extended screw-threaded tapered portion of the clamping nut which is passed over the lead spindle as previously described. The nut is now closed upon the lead spindle and its external thread screwed forcibly into the threaded hole in the sheet. The tap is now turned in the usual way to cut a thread in the unthreaded hole 2 and by reason of the fact that the nut 9 is provided with an external screw thread which registers with the screw thread in the previously tapped hole, and the further fact that the lead spindle 8 is provided with a screw thread which determines the forward movement of the tap by screwing through the threaded clamping jaws 15, all the threads being of the same pitch, this therefore provides a screw-threaded hole in the other sheet the screw-thread of which is absolutely continuous with the first formed screw thread in the previously tapped sheet. After a full thread has been cut in this second si we the tap, lead spindle and nut are remo᎒ the re- from and a staybolt having a  ᎒tir᎒ous thread may be inserted and will fit exactly without springing the sheets in either direction and this is true whether the sheets be parallel or inclined to each other, straight, curved or otherwise.

Although I have shown and described my invention in considerable detail, I do not wish to be limited to the exact details of construction specified, but may use such substitutions or modifications thereof as fall within the scope of my invention or as pointed out in the claims.

Having thus described my invention, what I claim and desire to secure by Letters Patent is:—

1. Tapping apparatus comprising a tap, a screw-threaded lead spindle axially secured thereto, an internal expansible nut revolubly mounted on said lead spindle, the threads of the tap, nut and spindle being of the same pitch.

2. Tapping apparatus comprising a short tap, a threaded lead spindle axially secured to the forward end thereof, a nut exteriorly tapered and mounted on said lead spindle, said nut being provided with internal expansibly threaded portions and with exterior threads on its outer tapered portion, all the threads being of the same pitch.

3. A tap provided with a screw-threaded portion of smaller diameter than its body projecting from its forward end, a threaded lead spindle axially secured to said portion by an internally threaded sleeve, an externally tapered nut mounted on said lead spindle and provided with collapsible internally threaded portions adapted to fit the thread thereof, the tapered portion of said nut being externally threaded, all of the threads aforesaid being of the same pitch.

4. A tapping apparatus comprising a tap, a threaded lead spindle secured longitudinally and axially thereto, a nut mounted on said lead spindle provided with an externally threaded tapered portion and with a plurality of internally threaded portions adapted to be contracted into or expanded out of engagement with the threads of the lead spindle aforesaid, all of the threads being of the same pitch.

5. In a tapping apparatus comprising a threaded tap and a threaded lead spindle secured axially to the forward end thereof, of a nut mounted on said lead spindle provided with a plurality of internally threaded clamping jaws mounted in said nut, and means for moving said clamping jaws into and out of engagement with the thread of said lead spindle, all the threads aforesaid being of the same pitch.

6. In a tapping device the combination with a tap and a threaded lead spindle axially and longitudinally secured to the forward end thereof, of a nut mounted on said lead spindle provided with a plurality of radially arranged clamping jaws the outer ends of said jaws being beveled, a cam ring surrounding said jaws and provided with inclined surfaces adapted to coöperate with the beveled ends of the clamping jaws whereby the turning of said ring will close the jaws on thread of the lead spindle, and means whereby on a reverse movement of said cam ring the clamping jaws will be retracted from said thread.

7. A tapping apparatus comprising a short screw-threaded tap provided with a screw threaded portion of lesser diameter projecting from its forward end, an internally screw-threaded sleeve on said projecting portion, a screw-threaded lead spindle screwed into said sleeve and projecting considerably therefrom, a nut mounted on said lead spindle provided with an externally tapered screw threaded portion, all the screw threads of the tap, lead spindle and nut being of the same pitch.

In witness whereof I have hereunto set my hand in the presence of two witnesses.

REINHOLD BETTERMANN.

Witnesses:
OLIVER B. HICKOX,
ELMER SEAVEY.